(12) United States Patent
Frye, Jr. et al.

(10) Patent No.: US 7,860,957 B1
(45) Date of Patent: Dec. 28, 2010

(54) SYSTEM AND METHOD FOR MANAGING NETWORK SERVICES IN A DISTRIBUTED SYSTEM

(75) Inventors: Dwight R. Frye, Jr., Cary, NC (US); Thomas R. Bakita, Raleigh, NC (US); John G. White, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1079 days.

(21) Appl. No.: 10/326,424

(22) Filed: Dec. 20, 2002

(51) Int. Cl.
*G06F 15/173* (2006.01)

(52) U.S. Cl. ...................... 709/223; 709/224

(58) Field of Classification Search ......... 709/223–226; 714/4
See application file for complete search history.

(56) References Cited

U.S. PATENT DOCUMENTS

| | | | |
|---|---|---|---|
| 5,691,964 A * | 11/1997 | Niederlein et al. | 369/30.06 |
| 5,774,668 A | 6/1998 | Choquier et al. | 395/200.53 |
| 5,907,607 A | 5/1999 | Waters et al. | 379/207 |
| 5,951,694 A | 9/1999 | Choquier et al. | 714/16 |
| 6,209,018 B1 * | 3/2001 | Ben-Shachar et al. | 718/105 |
| 6,247,056 B1 * | 6/2001 | Chou et al. | 709/229 |
| 6,334,114 B1 * | 12/2001 | Jacobs et al. | 705/26 |
| 6,360,256 B1 * | 3/2002 | Lim | 709/223 |
| 6,425,005 B1 * | 7/2002 | Dugan et al. | 709/223 |
| 6,446,204 B1 * | 9/2002 | Pang et al. | 713/153 |
| 6,516,349 B1 * | 2/2003 | Lieberman | 709/225 |
| 6,763,520 B1 * | 7/2004 | Seeds | 718/101 |
| 6,816,500 B1 * | 11/2004 | Mannette et al. | 370/431 |
| 6,877,035 B2 * | 4/2005 | Shahabuddin et al. | 709/226 |
| 7,051,980 B2 * | 5/2006 | Goodzeit et al. | 244/158.4 |
| 7,061,923 B2 * | 6/2006 | Dugan et al. | 370/396 |
| 2002/0124103 A1 * | 9/2002 | Maruyama et al. | 709/234 |
| 2003/0005028 A1 * | 1/2003 | Dritschler et al. | 709/104 |
| 2004/0133680 A1 * | 7/2004 | Sorrentino et al. | 709/226 |

* cited by examiner

*Primary Examiner*—Shawki S Ismail
(74) *Attorney, Agent, or Firm*—Baker Botts L.L.P.

(57) ABSTRACT

A system includes a network and multiple network devices. The network devices run instances of various services. If a particular network device becomes inaccessible, the system is capable of replacing the services instances running on the inaccessible network device by initiating new service instances on the remaining network devices. If a new network device becomes accessible, the network is capable of redistributing the currently running service instances to balance the workload by initiating service instances on the new network device and terminating service instances on existing network device.

40 Claims, 6 Drawing Sheets

SYSTEM AND METHOD FOR MANAGING NETWORK SERVICES IN A DISTRIBUTED SYSTEM

TECHNICAL FIELD OF THE INVENTION

This invention relates in general to distributed service systems, and more particularly to a system and method for managing network services.

BACKGROUND OF THE INVENTION

Distributed services are a common feature of modern computer networks. Often, to provide efficient allocation of processing resources, functionality needed by one or more computers or other components on the network is provided by a single computer for use by all the computers and components on the network. Traditionally, the services available have been bound to specific machines and often to specific ports on those specific machines.

However, network traffic, power outages, component failures, and a host of other impediments can prevent a computer from being able to access services being provided by another computer on the network. Thus, achieving a minimum degree of system reliability often requires redundant instances of a particular service be available on the network distributed across multiple machines. This results in an inefficient/allocation of network resources.

SUMMARY OF THE INVENTION

From the foregoing, it may be appreciated by those skilled in the art that a method is desired for managing network services in a distributed system that allows for reliable maintenance of network services. More specifically, a method is desired that allows the system to maintain a desired level of service availability despite changes in the availability of particular computers or of particular instances of services running on the network. In accordance with the present invention, the disadvantages and problems associated with distributed service systems have been substantially reduced or eliminated. In particular, the present invention provides a method and system for managing services on a distributed system, the method and system providing access to services even after failure of system components.

In accordance with one embodiment of the present invention, a method for managing network services in a distributed system includes initiating one or more instances of a service on a plurality of network devices. A change in the status of the network devices is detected. The number of service instances available on the network devices is adjusted.

In accordance with another embodiment of the present invention, a system for managing network services in a distributed system includes a plurality of network devices each network device capable of hosting one or more instances of a service. Additionally each network device may contain a reference module capable of determining the status of other network devices, a launch module capable of initiating service instances on any network devices and of terminating service instances on any network devices. A network connects all the network devices.

Important technical advantages of certain embodiments of the present invention include the ability to adjust the distribution of network services in response to a change in the network. Other important technical advantages of certain embodiments of the present invention include the ability to maintain the availability of a minimum number of instances of a particular service, the ability to balance the workload of network components, and the ability to provide greater reliability for critical network services. Certain embodiments may include all, some, or none of these technical advantages. Other technical advantages may be readily ascertainable by those skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
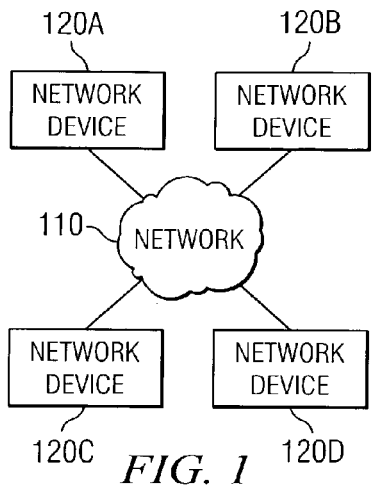
FIG. 1 illustrates a system which includes a network and multiple network devices.

FIG. 1 illustrates a system 100 that includes multiple network devices 120 and a network 110. Network 110 connects network devices 120 and may additionally connect to components external to system 100.

Network 110 represents any hardware and/or software configured to communicate information in the form of packets, cells, frames, segments, or other portions of data. Network 110 may include routers, hubs, switches, gateways, or any other suitable components in any suitable form or arrangement. In general, network 110 may comprise any combination of public or private communications equipment such as elements of a public switched telephone network (PSTN), a global computer network such as the Internet, a local area network (LAN), a wide area network (WAN), or other appropriate communications equipment.

Figure 2:
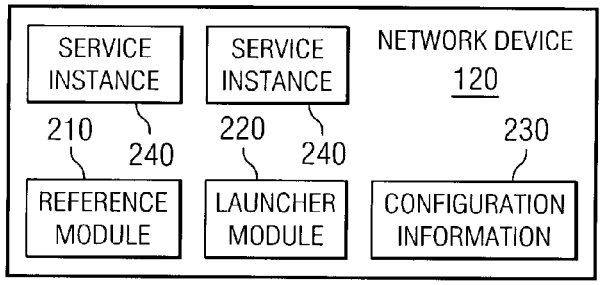
FIG. 2 illustrates an example network device in the system.

FIG. 2 illustrates further the contents of network devices 120 in a particular embodiment. Network device 120 may include a reference module 210, a launcher module 220, and configuration information 230. Although a particular network device 120 may not include each of launcher module 220, reference module 210, and configuration information 230, each will be present in at least one network device 120 in system 100.

Additionally, network device 120 may host one or more instances of various services, service instances 240, for use by network device 120 itself, other network devices 120 on the system 100, or external components in communication with the system. Service instances 240 may represent program, processes, algorithms or any other implementations of functionality available on system 100.

Reference module 210 of network device 120 monitors the status of system 100. The status of system 100 may include any information about the components or operation of system 100 including, but not limited to, the identity of network devices 120 operating on system 100 and the type and location of service instances 240 currently available on system 100. Reference module 210 may monitor the status of system 100 by actively polling network devices 120 and service instances 240, by accepting status messages from them, or by any other suitable means.

As noted above, although a particular network device 120 may not include reference module 210, at least one network device 120 on system 100 will include reference module 210. Furthermore, where more than one network device 120 on system 100 includes reference module 210, the functionality described herein can be divided in any suitable manner between the reference modules 210 as fits the characteristics and requirements of system 100.

Launcher module 220 of network device 120 is capable of launching new service instances 240 and terminating existing service instances 240 on the particular network device 120. In a particular embodiment of system 100, launcher module 220 is further operable to launch service instances 240 on network devices 120 other than the one on which it is located. As noted above, although a particular network device 120 may not include launcher module 220, at least one network device 120 on system 100 will include launcher module 220. Furthermore, where more than one network device 120 on system 100 includes launcher module 220, the functionality described herein can be divided in any suitable manner between the launcher modules 220 as fits the characteristics and requirements of system 100.

Reference module 210 and launcher module 220 may comprise logic encoded in media for carrying out functions of the system. The logic comprises functional instructions for carrying out programmed tasks. The media comprises computer disks or other suitable computer-readable media, application-specific integrated circuits (ASICs), field-programmable gate arrays (FPGAs), digital signal processors (DSPs), or other suitable specific or general purpose processors, transmission media, or other suitable media in which logic may be encoded and utilized. Furthermore, in a particular embodiment of system 100, launcher module 220 and reference module 210 are service instances 240 themselves that can be monitored, launched, or terminated similar to any other service instances 240.

Network device 120 may include configuration information 230. Configuration information 230 provides launcher module 220 with guidelines for launching service instances 240. For example, configuration information 230 may include information indicating a minimum or maximum number of service instances 240 of a particular service that should be running on system 100 at a given time, optimal distribution of service instances 240 among network devices 120, or any other criteria relevant to launching service instances 240. Configuration information 230 may represent data stored in a memory on network device 120, submitted to network device 120 by keyboard entry, hard-coded in components of network device, or made available to network device 120 by any other suitable means.

In operation, reference module 210 monitors the status of system 100 and communicates information about the status to launcher module 220. Reference module 210 communicates this information to launcher module 220. Based on the status of system 100 and on configuration information 230, launcher module 220 initiates or terminates service instances 240 on one or more network devices 120.

In a particular embodiment of system 100, network devices 120 communicate an active signal to, or register with, reference module 210 after becoming active. In various embodiments, network device 120 may register with all reference modules 210 simultaneously by broadcasting registration to all reference modules 210 on network 110 or, alternatively, may register with a single reference module 210 responsible for communicating the status of the new network device 120 to all other reference modules 210 on network 110. Reference system 100 tracks all active network devices 120. If a particular network device 120 fails to periodically re-register with reference module 210, reference module 210 treats the network device 120 as inactive and will not attempt to initiate service instances 240 on that network device 120.

Similarly, when a new service instance 240 is initiated, new service instance 240 registers with reference module 210. In various embodiments, service instance 240 may register with all reference modules 210 simultaneously by broadcasting registration to all reference modules 210 on network 110 or, alternatively, may register with a single reference module 210 responsible for communicating the status of the new service instance 240 to all other reference modules 210 on network 110. Thus, reference module 210 maintains information on all operating network devices 120 and on all service instances 240 available on the network devices 120.

Launcher module 220 processes the status information compiled by reference module 210 along with configuration information 230 and determines whether to initiate additional service instances 240 and on which network device 120 to initiate any additional service instances 240. Additionally, reference module 210 may determine whether to terminate service instances 240 on system 100 and which particular service instances 240 to terminate based on configuration information 230 and the status information compiled by reference module 210.

Figure 3A:
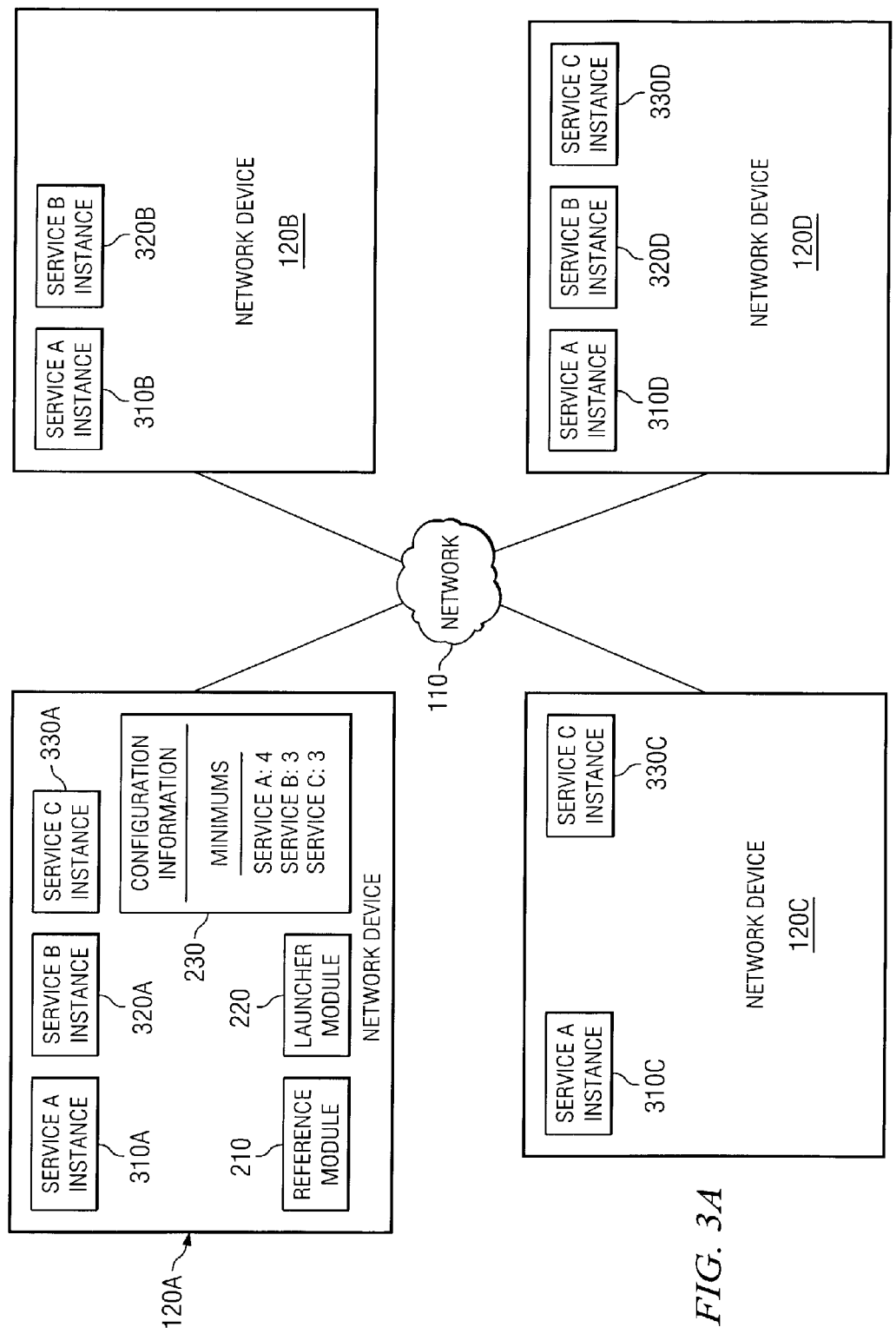
FIG. 3A illustrates a system running a variety of service instances on the network devices.
Figure 3B:
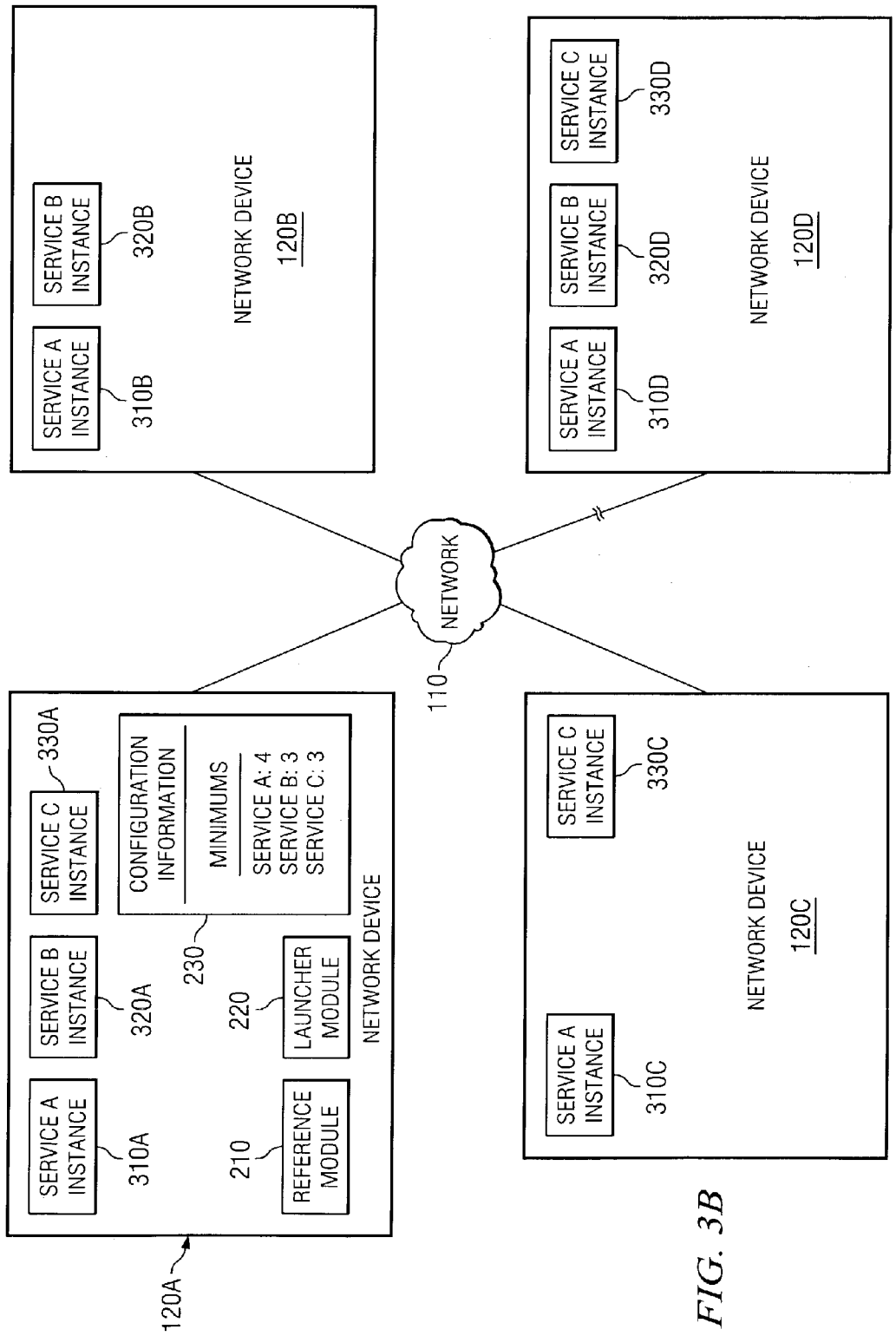
FIG. 3B shows the system of FIG. 3A immediately after one of the network devices becomes disabled.
Figure 3C:
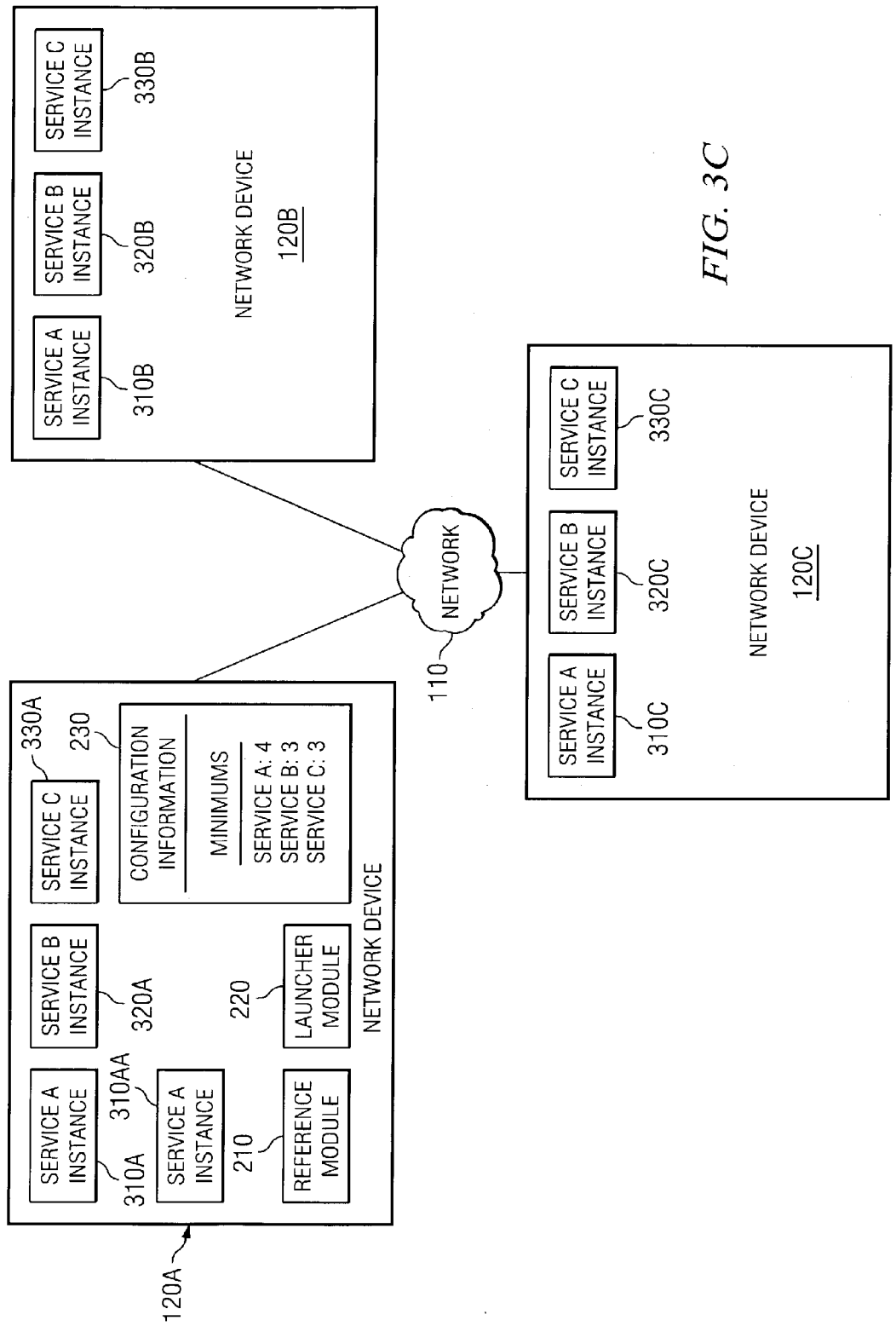
FIG. 3C illustrates operation of the system of FIG. 3A in response to the loss of the disabled network device.

FIGS. 3A-3C illustrate further the operation of system 100 according to a particular embodiment. More specifically, FIGS. 3A-3C detail the operation of reference module 210 and launcher module 220 in response to changes in the status of network devices 120 and service instances 240 on system 100.

FIG. 3A shows a system 100 initially containing four network devices 120A-D. Network device 120A maintains launcher module 220, reference module 210, and configuration information 230. Network device 120A also maintains a service instance of a first service, a service A instance 310A; a service instance of a second service, a service B instance 320B; and a service instance of a third service, a service C instance 330C.

Additionally, network device 120B runs service A instance 310B and service B instance 320B. Network device 120C runs service A instance 310C and service C instance 330C. Network device 120D runs service A instance 310D, service B instance 320D, and service C instance 330D. All of these network devices 120 and various service instances 310, 320, and 330 are registered with reference module 210.

In the example illustrated by FIGS. 3A-3C, configuration information 230 indicates that a minimum of four service A instances 310, three service B instances 320, and three service C instances 330 should be running on system 100 at any given time. In this example, configuration information 230 additionally includes guidelines for managing the workloads of individual network devices 120. Although FIG. 3A illustrates a configuration information 230 stored in a textual information, configuration information 230 may contain information in any format readable by network devices 120.

FIG. 3B shows the same system 100 immediately after network device 120D has been disabled. Network devices 120 can be disabled in any of a variety of ways. Disablement can result from power outages, component failures, excessive network traffic, or any other occurrence that prevents network devices 120 on system 100 from accessing service instances 240 running on the disabled network device 120D.

When network device 120D fails to re-register at the next designated time, reference module 210 detects the fact that network device 120D is disabled. Reference module 210 communicates this information to launcher module 220 which proceeds to adjust the number and distribution of service instances 240 based on configuration information 230.

FIG. 3C illustrates operation of system 100 in response to the loss of network device 120D. After reference module 210 indicates to launcher module 220 that network device 120D is disabled, reference module 210 begins to adjust the distribution of service instances 240.

As discussed above, configuration information 230 in this embodiment defines a minimum number of service instances 240 for each particular service. Specifically, configuration information 230 indicates that a minimum of four service A instances 310, three service B instances 320, and three service C instances 330 should be running on system 100 at any given time.

After network device 120D is disabled, three service A instances, two service B instances, and two service C instances exist on system 100. As a result, the service instances 240 available on system 100 do not satisfy the minimums defined in configuration information 230. Thus, launcher module 220 initiates a service A instance 310AA on network device 120A, a service B instance 320C on network device 120C, and a service C instance 330B on network device 120B. Following these additions, system 100 once again satisfies the minimums defined by configuration information 230.

Alternatively, configuration information 230 may define a maximum number of service instances 240 of a particular service that may be running on system 100. If programs, components, or users of system 100 initiate a sufficient number of service instances 240 of the particular service so that the total number of service instances 240 for the particular service exceed the maximum number, launcher module 220 will terminate enough service instances 240 of the particular service so that the total number does not exceed the maximum.

Additionally, system 100 may be designed so that a single network device 120 will not run multiple copies of a particular service instance 240. In cases where the number of service instance 240 of a particular service is less than the minimum but all of the network devices 120 presently accessible are already running service instances 240 of the service, reference module 210 will monitor network devices 120 and wait until a new network device 120 becomes accessible before initiating additional service instances 240 of the service.

For example, if the system 100 illustrated in FIG. 3C were configured in this manner, launcher module 220 would not initiate service A instance 310AA as network device 120A is already running a service A instance 310A. Instead, launcher module 210 would wait until reference module 210 detected a new network device 120 on network 110 before initiating a new service A instance 310A. Launcher module 210 would then initiate the new service A instance 310AA on the new network device 120.

Figure 4A:
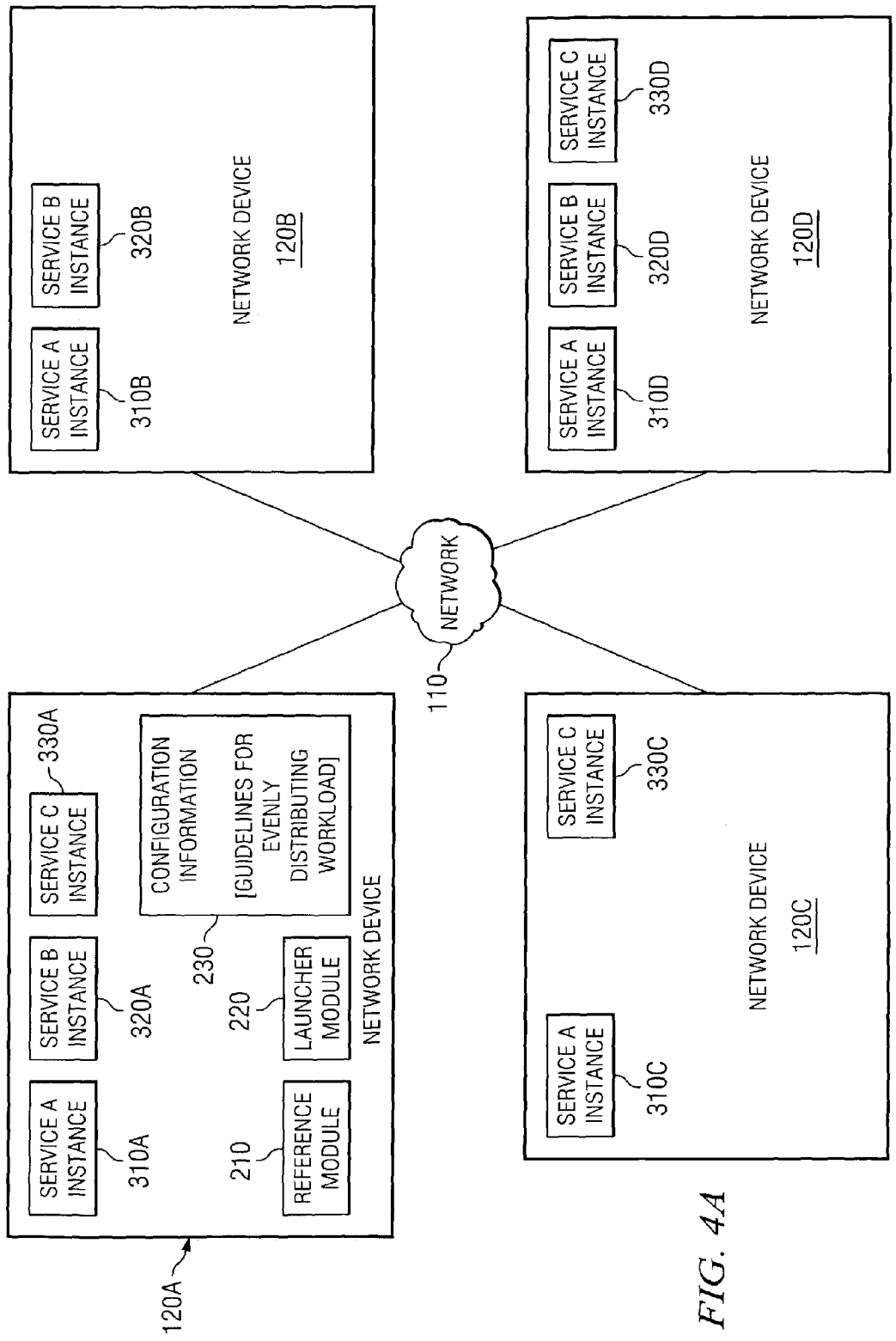
FIG. 4A illustrates a system running a variety of service instances on the network devices.
Figure 4B:
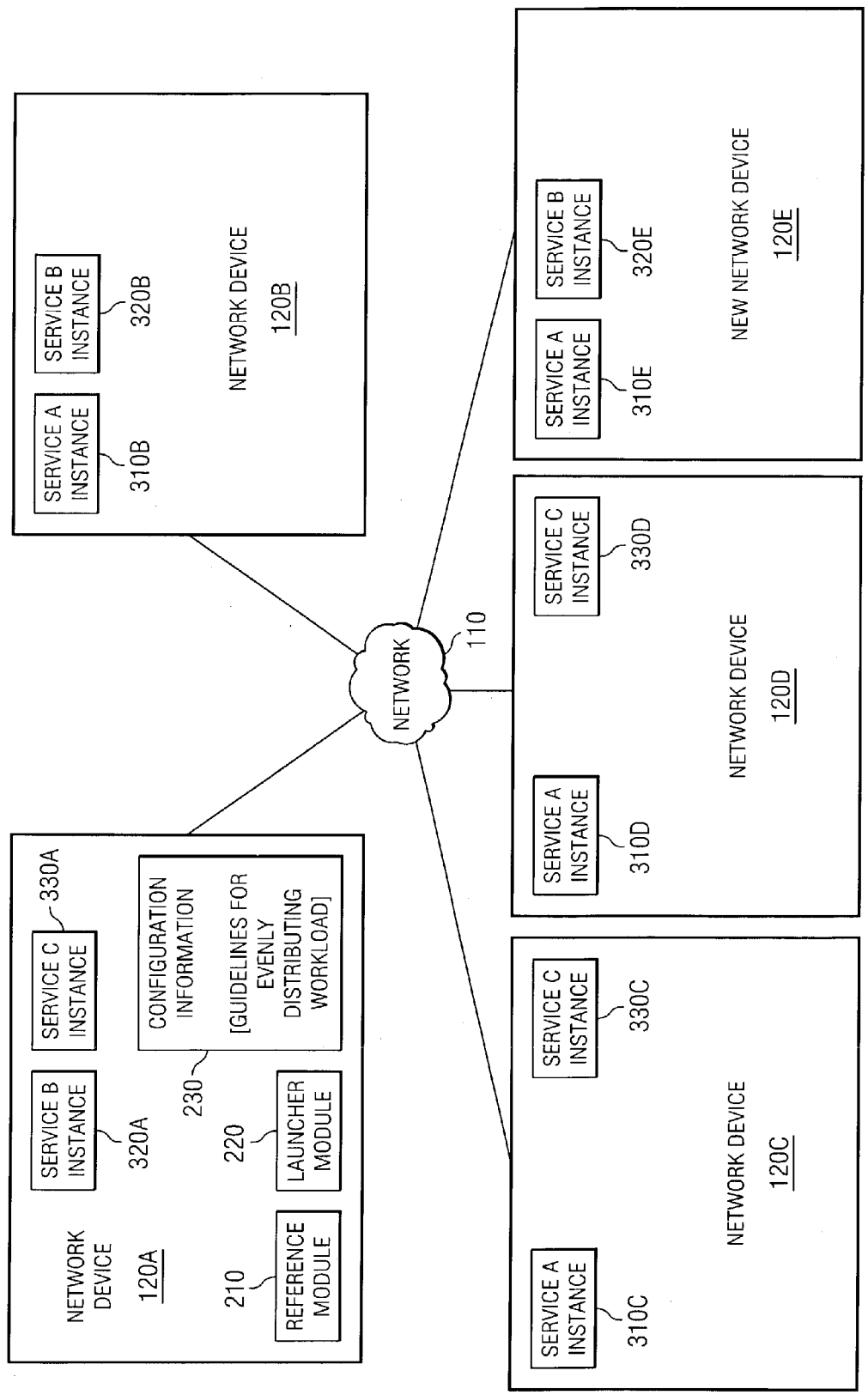
FIG. 4B illustrates operation of the system of FIG. 4A in response to the addition of the new network device.

FIGS. 4A and 4B illustrate operation of system 100 in response to the addition of a new network device 120. In a particular embodiment, system 100 may adjust the distribution of service instances 240 on system 100 in response to a new network device 120E becoming available on system 100.

FIG. 4A illustrates the state of system 100 immediately following the addition of network device 120 to network 110. New network device 120E registers with reference module 210 according to the procedures of the particular system 100. In a particular embodiment of system 100, configuration information 230 includes guidelines for managing the workload of network devices 120. As a result, system 100 may adjust the distribution of service instances 240 as a result of the addition of new network device 120E to network 110.

In the exemplary system 100 illustrated by FIG. 4A, configuration information 230 provides information dictating that launcher module 220 should evenly balance the workload among the network devices 120. After new network device 120E registers with reference module 210, reference module 210 communicates to launcher module 220 the availability of new network device 120E.

FIG. 4B illustrates operation of system 100 in response to the addition of new network device 120E. Based on configuration information 230, system 100 may redistribute service instances 240 across the various network devices 120. System 100 may manage the distribution of service instances 240 to ensure an even division of the workload among network devices 120, to provide more powerful network devices 120 with a larger share of the workload, to keep critical services on the most reliable network devices 120, or to achieve any other management goal. Furthermore, the guidelines provided in configuration information 230 may effectuate this management goal in a variety of ways such as by prescribing relative workloads for individual network devices 120, by providing rules for specific situations, or by guiding the operation of launcher module 220 through any other suitable means.

Based on the configuration information 230, launcher module 220 proceeds to balance the service instances among the network devices 120 on network 110. As a result, launcher module 220 initiates a service A instance 310E and a service B instance 320E on new network device 120E. Also, launcher module 220 terminates a service A instance 310A from network device 120A and terminates a service B instance 320D from network device 120D. As a result, the distribution of service instances on system 100 is balanced in accordance with the guidelines of configuration information 230.

Figure 5:
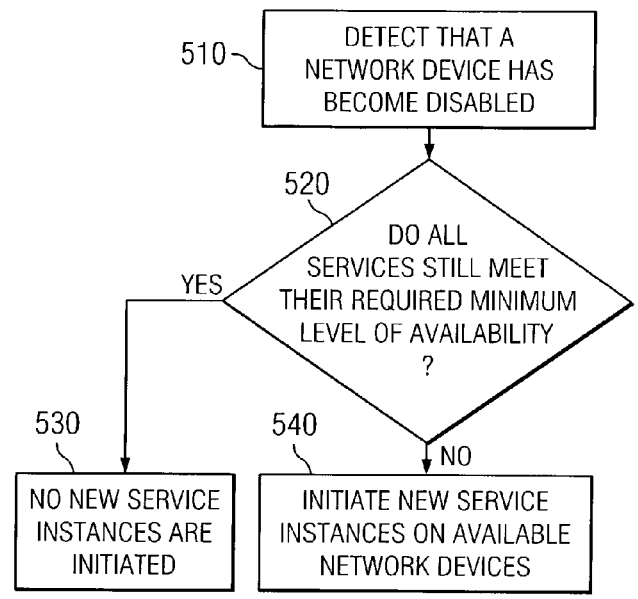
FIG. 5 is a flow chart detailing the operation of the system in response to the loss of a disabled network device.

FIG. 5 is a flow chart diagramming operation of a particular embodiment of system 100 when a network device 120 becomes disabled. At step 510, system 100 detects that a network device 120 running service instances 240 of particular services has become disabled. At step 520, system 100 determines, based on currently running service instances 240 and configuration information 230, whether system 100 is presently running the designated minimum number of service instances 240 for services affected by the loss of the disabled network device.

If, despite the loss of disabled memory device 120, system 100 is still running the designated minimum number of service instances 240 for the affected services, then system 100 does not initiate any new service instances 240 at step 530. However, if system 100 is currently running an insufficient number of service instances for any of the affected services, system 100 selects an available network device 120 and initiates new service instances 240 on the network device 120 as needed to bring all affected services back to their designated minimum level at step 540.

Figure 6:
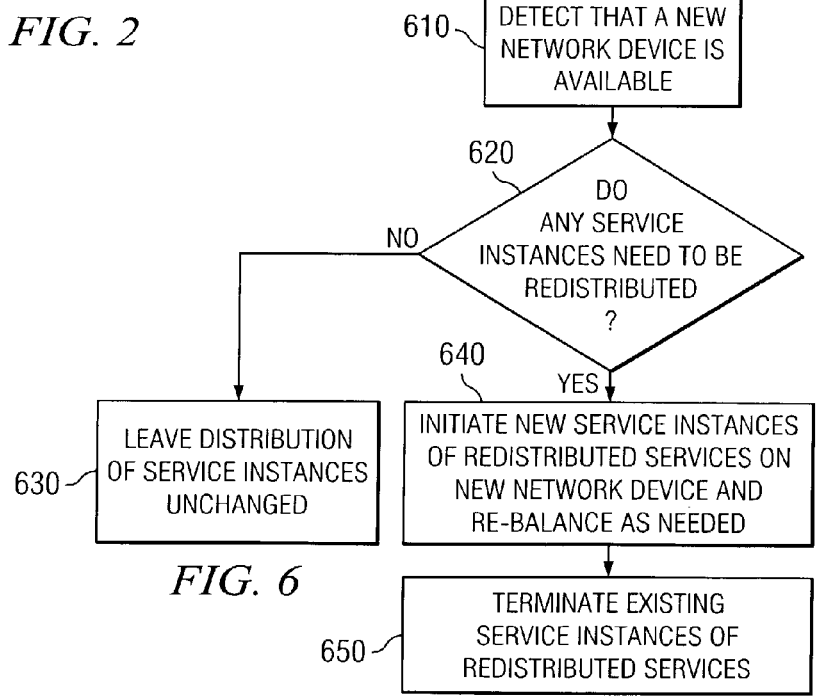
FIG. 6 is a flow chart detailing the operation of the system in response to the addition of a new network device.

FIG. 6 is a flow chart diagramming operation of a particular embodiment of system 100 when a new network device 120 is added to system 100. At step 610, system 100 detects a new network device 120 operating on network 110 as a result of the new network device 120 registering with reference module 210. At step 620, system 100 determines based on configuration information 230 and the service instances 240 currently running on network 110 whether service instances 240 should be redistributed, e.g. to balance the workload more evenly between network devices 120.

If no service instances 240 need to be redistributed, system 100 leaves the distribution of service instances 240 running on network 110 unchanged at step 630. If service instances should be redistributed, system 100 initiates service instances 240 of particular redistributed services on new network device 120 at step 640. Rebalancing of service instances 240 may also be performed by various algorithms and configurations that allow proper service distribution throughout network 110. In this manner, any given network device 120, is not overburdened and any given network device 120 does not become so important that its failure makes network 110 less resilient. System 100 then terminates an equal number of service instances 240 on network devices 120 that are presently running service instances 240 of the redistributed services at step 650.

Thus it is apparent that there has been provided, in accordance with the present invention, a system and method for managing network services in a distributed system that satisfies the advantages set forth above. Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for managing network services in a distributed system, comprising:
    determining a minimum number of instances of a service of a plurality of services, the instances of the service comprising a plurality of launcher modules, each launcher module configured to launch one or more instances of one or more services;
    initiating, by a first launcher module, at least the minimum number of instances of the service on a plurality of network devices;
    detecting an inaccessibility of a particular network device having at least one instance of the service, the at least one instance comprising a second launcher module;
    determining that a remaining accessible number of instances for the service on the remaining accessible network devices is less than the minimum; and
    initiating, by the first launcher module, the at least one instance comprising the second launcher module on at least one other of the remaining accessible plurality of network devices in response to the remaining accessible number of instances of the service being less than the minimum in order to return the number of instances to at least the minimum.

2. The method of claim 1, further comprising:
    maintaining the number instances in response to the remaining accessible number of instances being equal to or greater that the minimum.

3. The method of claim 1, further comprising:
    monitoring the instances of the service on the network;
    detecting a loss of an existing instance of the service; and
    initiating a new instance of the service on a network device.

4. The method of claim 3, wherein:
    detecting a loss of an existing instance comprises detecting a loss of an instance of the service resulting in less than the minimum number of instances of the service being available on the network; and
    initiating a new instance of the service comprises adding a new instance of the service to an available network device in order to establish the minimum number of instances of the service in response to detecting the loss.

5. The method of claim 1, further comprising:
    determining a maximum number of instances of the service; and
    initiating a number of instances of the service, wherein the number of instances is less than the maximum number.

6. The method of claim 5, further comprising:
    detecting that more than the maximum number of instances of the service are available on the network; and
    terminating one or more instances of the service on the network devices to establish the maximum number of instances of the service.

7. The method of claim 1, further comprising:
    monitoring the network devices;
    detecting a new network device; and
    in response to detecting the new network device, initiating a new instance of the service on the new network device.

8. The method of claim 1, further comprising:
    monitoring the network devices;
    detecting a new network device providing an instance of the service; and
    terminating an existing instance of the service on a network device.

9. The method of claim 1, further comprising:
    terminating an existing instance of the service on a network device in response to the number of instances of the service being greater than the minimum.

10. A system for managing network services in a distributed system, comprising:
    a reference module processor operable to detect a change in a status of a plurality of network devices and of instances of a service of a plurality of services operating therein, the instances of the service comprising a plurality of launcher modules, each launcher module configured to launch one or more instances of one or more services;
    a memory operable to store configuration information; and
    a launch module processor operable to:
        determine a minimum number of instances of the service based on the configuration information;
        initiate, by a first launcher module, at least the minimum number of instances of the service on the plurality of network devices;
        detect an inaccessibility of a particular network device having at least one instance of the service, the at least one instance comprising a second launcher module;
        determine that a remaining accessible number of instances for the service on the remaining accessible network devices is less than the minimum; and
        initiate, by the first launcher module, the at least one instance comprising the second launcher module on at least one other of the remaining accessible plurality of network devices in response to the remaining accessible number of instances of the service being less than the minimum in order to return the number of instances to at least the minimum.

11. The system of claim 10, wherein the launch module processor is operable to initiate and terminate instances of the service on the network devices.

12. The system of claim 10, wherein the reference module processor is operable to monitor the instances of the service on the network devices and detect a loss of an existing instance of the service, the launch module processor is operable to initiate a new instance of the service on a network device in response to the loss of the existing instance.

13. The system of claim 10, wherein the configuration information defines a maximum number of instances of the service, each launch module processor operable to terminate instances of the particular service if the number of instances of the particular service is greater than the maximum number.

14. The system of claim 10, wherein the reference module processor and the launch module processor comprise instances of the service.

15. The system of claim 10, wherein the reference module processor is operable to detect a new network device coupled to the network, the launch module processor operable to terminate instances of the service on existing network devices in response to detecting the new network device and operable to initiate instances of the service on the new network device.

16. The system of claim 10, wherein the reference module processor and the launch module processor can be located on the same or different network devices.

17. The system of claim 10, wherein the launch module processor is operable to terminate an existing instance of the service on a network device in response to the number of instances of the service being greater than the minimum.

18. An apparatus for managing network services in a distributed system, comprising:
   a network device of a plurality of network devices, wherein at least one network device is operable to detect a change in a status of the network and wherein the network device is operable to:
      determine a minimum number of instances of a service of a plurality of services, the instances of a service comprising a plurality of launcher modules, each launcher module configured to launch one or more instances of one or more services;
      initiate, by a first launcher module, at least the minimum number of instances of the service on the plurality of network devices; and
      detect an inaccessibility of a particular network device having at least one instance of the service, the at least one instance comprising a second launcher module;
      determine that a remaining accessible number of instances for the service on the remaining accessible network devices is less than the minimum; and
      initiate, by the first launcher module, the at least one instance comprising the second launcher module on at least one other of the remaining accessible plurality of network devices in response to the remaining accessible number of instances of the service being less than the minimum in order to return the number of instances to at least the minimum.

19. The apparatus of claim 18, wherein inaccessibility of a particular network device comprises a loss of an existing instance of the service.

20. The apparatus of claim 18, wherein inaccessibility of a particular network device comprises failure of the particular network device.

21. The apparatus of claim 18, wherein at least one network device is operable to adjust the minimum number of instances of the service based on configuration information.

22. The apparatus of claim 18, wherein at least one network device is operable to initiate additional instances of the service if the total number of instances of the service available on the network devices is greater than a predetermined maximum.

23. The apparatus of claim 18, wherein at least one network device is operable to terminating an existing instance of the service on a network device in response to the number of instances of the service being greater than the minimum.

24. A non-transitory computer readable medium storing code executable by a processor, for managing network services in a distributed system, the code causing the processor to perform the following:
   determine a minimum number of instances of a service of a plurality of services, the instances of the service comprising a plurality of launcher modules, each launcher module configured to launch one or more instances of one or more services;
   initiate, by a first launcher module, at least the minimum number of instances of the service on one or more of a plurality of network devices;
   detect an inaccessibility of a particular network device having at least one instance of the service, the at least one instance comprising a second launcher module;
   determine that a remaining accessible number of instances for the service on the remaining accessible network devices is less than the minimum; and
   initiate, by the first launcher module, the at least one instance comprising the second launcher module on at least one other of the remaining accessible plurality of network devices in response to the remaining accessible number of instances of the service being less than the minimum in order to return the number of instances to at least the minimum.

25. The non-transitory computer readable medium of claim 24, maintaining the number instances in response to the remaining accessible number of instances being equal to or greater that the minimum.

26. The non-transitory computer readable medium of claim 24, the code further operable to monitor the instances of the service on the network.

27. The non-transitory computer readable medium of claim 24, the code further operable to:
   detect the inaccessibility of the particular network device by detecting a loss of an instance of the service resulting in less than the minimum number of instances of the service being available on the network; and
   initiate a new instance of the service on the network devices by adding a new instance of the service to an available network device in order to establish the minimum number of instances of the service.

28. The non-transitory computer readable medium of claim 24, the code further operable to:
   determine a maximum number of instances of the service; and
   initiate a number of instances of the service, wherein the number of instances is less than the maximum number.

29. The method of claim 28, the code further operable to:
   detect that more than the maximum number of instances of the service are available on the network; and
   terminate one or more instances of the service on the network devices to establish the maximum number of instances of the service.

30. The non-transitory computer readable medium of claim 24, the code further operable to:
   monitor the network devices;
   detect a new network device; and
   initiate a new instance of the service on the new network device.

31. The non-transitory computer readable medium of claim 24, the code further operable to:
   monitor the network devices;
   detect a new network device providing an instance of the service; and terminate an existing instance of the service on the new network device.

32. The computer readable medium of claim 24, wherein the code is further operable to terminate an existing instance of the service on a network device in response to the number of instances of the service being greater than the minimum.

33. A system for managing network services in a distributed system, comprising:
means for determining a minimum number of instances of a service of a plurality of services, the instances of the service comprising a plurality of launcher modules, each launcher module configured to launch one or more instances of one or more services;
means for initiating, by a first launcher module, at least the minimum number of instances of the service on a plurality of network devices;
means for detecting an inaccessibility of a particular network device having at least one instance of the service, the at least one instance comprising a second launcher module;
means for determining that a remaining accessible number of instances for the service on the remaining accessible network devices is less than the minimum; and
means for initiating, by the first launcher module, the at least one instance comprising the second launcher module on at least one other of the remaining accessible plurality of network devices in response to the remaining accessible number of instances of the service being less than the minimum in order to return the number of instances to at least the minimum.

34. The system of claim 33, maintaining the number instances in response to the remaining accessible number of instances being equal to or greater that the minimum.

35. The system of claim 33, further comprising means for monitoring the instances of the service on the network.

36. The system of claim 33, wherein:
the means for detecting an inaccessibility of a particular network device comprises means for detecting a loss of an instance of the service resulting in less than the minimum number of instances being available on the network; and
the means for means for initiating the at least one instance of the service comprises means for adding a new instance of the service to a network device in order to establish the minimum number of instances of the service.

37. The system of claim 33, further comprising:
means for determining a maximum number of instances for the service; and
means for initiating a number of instances of the service, wherein the number of instances is less than the maximum number.

38. The system of claim 33, further comprising:
means for monitoring the network devices;
means for detecting a new network device; and
means for initiating a new instance of the service on the new network device.

39. The system of claim 33, further comprising:
means for monitoring the network devices;
means for detecting a new network device providing an instance of the service; and
means for terminating an existing instance of the service on the new network device.

40. The system of claim 33, further comprising:
means for terminating an existing instance of the service on a network device in response to the number of instances of the service being greater than the minimum.

* * * * *